United States Patent Office 3,453,192
Patented July 1, 1969

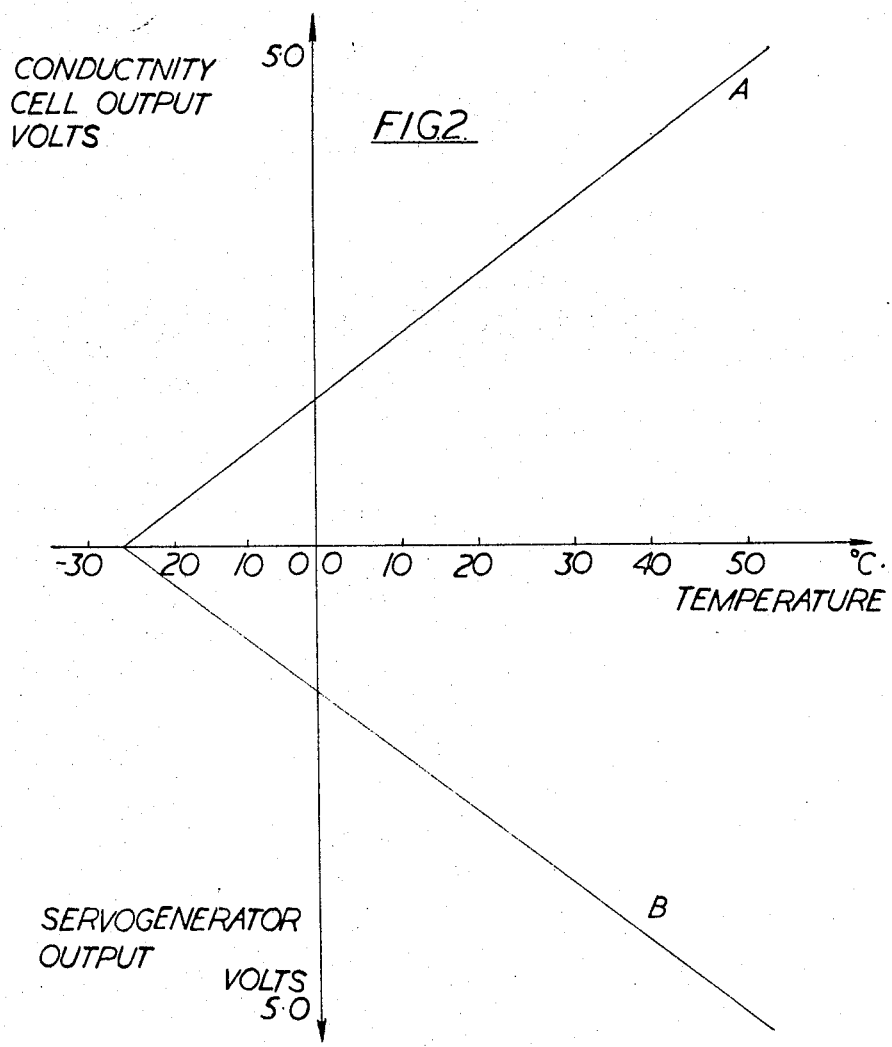

3,453,192
PROCESS AND APPARATUS FOR MAINTAINING A GAP IN ELECTROCHEMICAL MACHINING
Bernard Hall Wilkinson, Skipton, England, assignor to Rolls-Royce Limited, Derby, Derbyshire, England, a British company
Filed May 23, 1966, Ser. No. 552,051
Claims priority, application Great Britain, June 18, 1965, 25,991/65
Int. Cl. B23p *1/14, 1/02, 1/00*
U.S. Cl. 204—143  15 Claims

ABSTRACT OF THE DISCLOSURE

A method of manufacturing an electrolytically machined workpiece wherein the workpiece and a cathode are mounted for relative movement, with a gap therebetween, an electrolyte being supplied to said gap comprising deriving a first signal representative of the conductivity of the electrolyte, deriving a second signal which is independent of the electrolytic current and is representative of the rate of said relative movement combining said signals to produce a control signal and controlling said relative movement in accordance with said control signal to maintain the said gap at a predetermined size independently of changes in the conductivity of the electrolyte.

---

Figure 1:
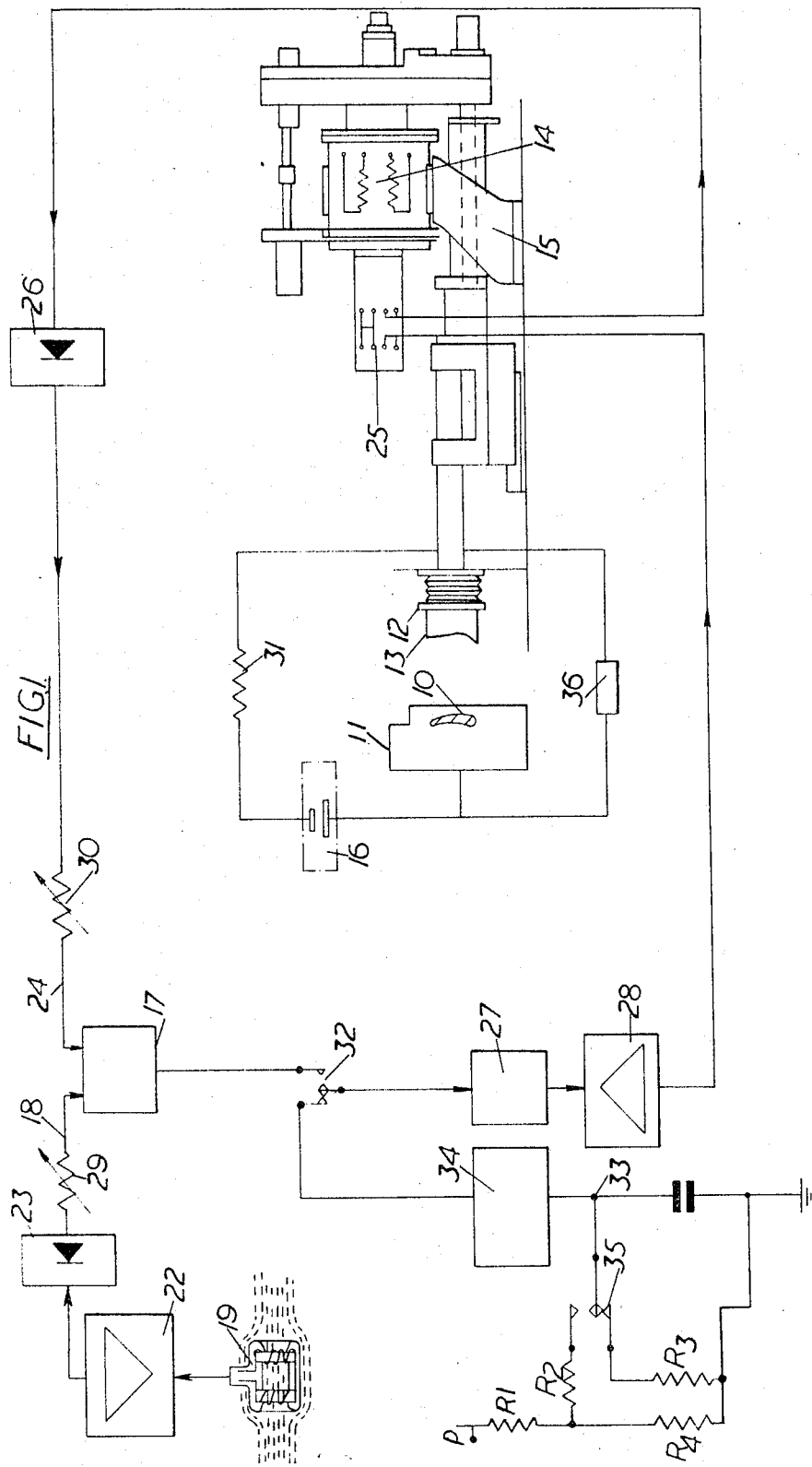

This invention concerns improvements in or relating to electrolytic machining.

The technique of electrolytic machining is well known. A workpiece which is to be electrolytically machined and a cathode are mounted for relative movement towards or away from each other with a gap separating them, an electrolyte is supplied to the gap, and the cathode is maintained at a negative potential with respect to the workpiece. The process of electrolysis causes the workpiece to be eroded and by suitably controlling the erosion, the workpiece can be machined to a desired shape analogously to a conventional milling process. Electrolytic machining has numerous applications, for example, to the machining to desired aerofoil shapes of rough forgings of turbine blades for gas turbine engines.

It will be appreciated that as the electrolytic erosion proceeds, the size of the gap between the workpiece and and the cathode will increase unless corrective measures are taken; the electrical resistance of the gap will increase and the electrolytic current will fall as a result. To avoid this undesirable effect, the workpiece and the cathode are moved relatively towards each other as the electrolytic machining proceeds so as to maintain the size of the gap constant.

In maintaining the size of the gap constant, account also has to be taken of changes in the conductivity of the electrolyte due, for example, to changes in the temperature or concentration thereof. One method of controlling the relative movement of the workpiece and the cathode which has been proposed employs servo means which are controlled in accordance with two signals, one of which varies with the current flowing between the workpiece and the cathode and the other of which varies with the conductivity of the electrolyte. Changes in the former signal due to changes in the conductivity of the electrolyte are compensated by the latter signal, so that the size of the gap is maintained substantially constant. Such a method, and apparatus for performing the same, is described and claimed in our British patent specification No. 937,681. This method suffers from the drawback that it is unsuitable for machining workpieces where the area of the workpiece being electrolytically eroded changes as the erosion proceeds, as, for example, when areofoil shapes such as turbine blades are to be electrolytically machined from a solid blank of metal: as the area of the workpiece changes, the current between the workpiece and the cathode will change and the size of the gap will be changed by the servo means. The present invention has as one of its objects to provide a method of and apparatus for electrolytically machining a workpiece which automatically compensates for changes in the conductivity of the electrolyte and which is insensitive to changes in the area of the workpiece.

According to one aspect of the invention, there is provided a method of manufacturing an electrolytically machined workpiece in which the workpiece and a cathode are mounted for relative movement towards or away from each other, with a gap therebetween, an electrolyte is supplied to said gap and the workpiece is maintained at a positive potential with respect to the cathode, said method comprising deriving a first signal which is representative of the conductivity of the electrolyte, deriving a second signal which is independent of the electrolytic current and is representative of the rate of said relative movement between the workpiece and the cathode, combining said first and second signals to produce a control signal and controlling said relative movement between the workpiece and the cathode in accordance with said control signal so as to maintain the said gap at a predetermined size substantially independently of changes in the conductivity of the electrolyte.

Since the control signal is not derived from or dependent on the current flowing between the workpiece and the cathode, changes in the area of the workpiece as the electrolytic machining thereof proceeds will not affect the control signal or, therefore, the size of the gap.

In another aspect the invention provides apparatus for electrolytically machining a workpiece comprising servo means for moving the workpiece and a cathode relatively towards or away from each other with a gap therebetween, means for supplying an electrolyte to said gap, means for maintaining the workpiece at a positive potential with respect to the cathode, means for providing a first signal which is representative of the conductivity of the electrolyte, means for providing a second signal which is independent of the electrolytic current and which is representative of the rate of said relative movement between the workpiece and the cathode, and servo control means for combining said first and second signals to produce a control signal for controlling said servo means whereby said gap is maintained at a predetermined size substantially independently of changes in the conductivity of the electrolyte.

Means are preferably provided for adjusting the relative magnitudes of said first and second signals so that, when said gap has predetermined size, said two signals balance each other and said control signal is substantially zero.

The said first signal is preferably derived from a direct measurement of the conductivity of the electrolyte. Thus, the means for supplying electrolyte may include a cell through which at least a proportion of said electrolyte passes, said cell being provided with a constant potential at its input, and said first signal being derived at the output of the cell.

Said servo means in a preferred embodiment comprise a motor and said means for providing the second signal comprise a generator which is coupled to said motor and driven thereby.

The invention will be described by way only of example with reference to the accompanying drawings, in which:

FIGURE 1 is a diagrammatic representation of apparatus according to a preferred embodiment of the invention, and FIGURE 2 is a graph showing the variation with temperature of the conductivity of the electrolyte and the rate of advance of the cathode relative to the workpiece for a constant gap between the cathode and the workpiece.

FIGURE 1 shows diagrammatically the basic features of an electrolytic machining apparatus. A metal workpiece 10, which may be, for example, a solid blank for a turbine blade of a gas turbine engine, is mounted in a workpiece holder 11. A cathode 12 is mounted for relative movement towards and away from the workpiece 10. The cathode 12 is provided with a machining head 13 which has a shaped surface conforming to the desired shape of the surface of workpiece 10. Movement of the cathode 12 towards and away from the workpiece 10 is effected by a servo-motor 14 rotation of which in opposite respective directions causes advancement or retraction respectively of the cathode 12 relative to the workpiece 10 through suitable gearing indicated at 15.

As shown in FIGURE 1 the cathode 12 is retracted. In operation, the cathode 12 is advanced towards the workpiece 10 until it is separated therefrom by a predetermined gap. An electrolyte, for example, sodium chloride solution, is supplied to the gap (by means not shown) and a direct current power supply 16 is connected between the workpiece 10 and the cathode 12, the workpiece 10 being thereby maintained at a positive potential, typically about ten volts, with respect to the cathode 12. Electrolytic action takes place, the material of the workpiece 10 being eroded and the products of the electrolysis being removed in the form of hydroxide sludges with the electrolyte. A constant flow of electrolyte through the gap between the workpiece and the cathode is maintained for the efficient removal of said products. The size of the gap is arranged to be as small as possible consistent with the efficient removal of the products of electrolysis and is typically about 15 thousandths of an inch in practice.

As the electrolytic erosion of the workpiece 10 proceeds, the servomotor 14 is driven at a constant speed so as to advance the cathode 12 at the same rate as the erosion of the workpiece 10, thereby maintaining the size of the gap and, therefore, the rate of electrolytic machining by a control signal derived from a servo control device 17.

The servo control device 17 has two inputs. The first input, indicated at 18, comprises a signal representative of the conductivity of the electrolyte. Prior to being supplied to the gap between the workpiece 10 and the cathode 12, the electrolyte, or a sample thereof, is passed through a conductivity cell 19, which may be of any convenient known type. The alternating current (A.C.) output from the cell 19 is proportional to the conductivity of the electrolyte in the cell 19. After amplification at 22, the said A.C. output is rectified by a rectifier 23. The rectified output from the conductivity cell 19 is a D.C. voltage proportional to the conductivity of the electrolyte and comprises the first input 18 of the servo control device 17.

The second input of the servo control device 17, indicated at 24, comprises a signal representative of the rate of advance of the cathode 12 relative to the workpiece 10 and is derived from an A.C. generator 25 which is coupled to and driven by the servomotor 14. The output of the generator 25 is rectified at 26 and applied as the said second input signal of the servo control device 17. The said second input signal is therefore a D.C. voltage proportional to the speed of the servomotor 14 and therefore to the rate of advance of the cathode 12.

It is arranged that the first and second input signals at 18, 24 are respectively D.C. voltages of opposite polarity. The servo control device 17 is adapted to combine the two input signals by effecting an algebraic summation thereof. The output of the device 17 is therefore a D.C. voltage proportional to the difference between said first and second input signals. A chopper unit 27 converts this D.C. voltage into a pulsating signal which is amplified by an amplifier 28 to produce a control signal. The control signal is passed to the servomotor 14 and controls the speed thereof.

The arrangement described above will be recognized as a simple servo loop for controlling the servomotor 14. By suitable controls, indicated diagrammatically at 29, 30, in the respective control device inputs 18, 24, it is arranged that the first and second input signals are exactly equal to each other when the size of the gap between the workpiece 10 and the cathode 12 has a predetermined desired value: the output of the control device 17 is then zero. Under these conditions it is arranged that the servomotor 14 advances the cathode 12 at a predetermined constant rate which exactly equals the rate of erosion of the workpiece 10. This predetermined rate of advance is adjusted (by means not shown) at the servomotor 14 and is selected in accordance with the nature of the metal being electrolytically machined.

Any change in the conductivity of the electrolyte will change the rate of erosion of the workpiece 10. Such a change will, however, be detected by the conductivity cell 19 which will change the first input signal 18. The control signal from the servo control device 17 will therefore change and alter the speed of the servomotor 14 in such a way as to "match" the change in erosion rate of the workpiece 10, thereby maintaining the size of the gap between the workpiece 10 and the cathode 12 constant. The apparatus is therefore automatically compensated for changes in the conductivity of the electrolyte.

The automatic compensation for electrolyte conductivity according to the invention is illustrated graphically in FIGURE 2. Graph A plots the variation with temperature of the first input signal of the servo control device 17, that is, effectively the variation of the conductivity of the electrolyte, a normal (56 gm. per litre) solution of sodium chloride, with temperature. Graph B plots the variation with temperature of the second input signal of the control device 17, that is, effectively the rate of advance of the cathode 12 for a constant gap. Both graphs A and B are seen to be linear. This means that by suitably adjusting the controls 29, 30 in the respective first and second inputs 18, 24, graph A can be arranged, for a given workpiece material and a given gap size, to be an exact mirror image of graph B, so that compensation for electrolyte conductivity is substantially complete at all temperatures.

It will be noted that, since control is not effected in accordance with the electrolytic current passing between the workpiece 10 and the cathode 12, the conductivity compensation according to the invention is unaffected by changes in the area of the workpiece 10 during the electrolytic machining process.

A resistor 31 is connected in series in the circuit between the power supply 16 and the cathode 12. One or more meters (not shown) connected in shunt with the resistor 31 will provide readings proportional to the electrolytic current and, therefore, to the rate of erosion of the workpiece 10. A further meter (not shown) may also be connected in shunt with the resistor 31 to provide an indication of excessive current in the event of a short circuit between the cathode 12 and the workpiece 10: it may further be aranged that a circuit breaker relay (not shown) is operated to open the power supply circuit in the event of such a short circuit.

Control of the electrolytic machining current between the workpiece and the cathode may be effected manually in response to the readings of said meters in shunt with the resistor 31 or automatically in response thereto.

Advancement of the cathode 12 during electrolytic machining of the workpiece 10 is maintained at a predetermined constant rate by means of the servo control device 17. Movement of the cathode 12 towards and away from the workpiece 10 can be effected independently of the servo control device 17 when, for example, the apparatus is being initially set up to machine the workpiece 10. For this purpose a relay 32 is provided in the output of the control device 17. In its operative position, as illustrated in FIGURE 1, the relay 32 disconnects the servo control device 17 from the chopper unit 27 and connects the latter to a point 33 in a capacitance-resistance network through a cathode follower unit 34. The potential at point 33 is determined by the charge on a capacitor C. When it is desired to advance the cathode 12, the capacitor C is charged through resistances $R_1$, $R_2$ and a relay 35 from a negative power supply indicated at P, causing the potential at point 33 to fall at a rate determined by the time constant of the combination C, $R_1$, $R_2$ and energizing the servomotor 14 through the chopper unit 27 and amplifier 28. When it is desired to retract the cathode 12, the relay 35 is moved into the setting in which it is illustrated, connecting the point 33 to earth through a resistor $R_3$. The capacitor C discharges at a rate determined by the time constant of the combination C, $R_3$ and the potential at point 33 rises, causing rotation of the servomotor 14 in the opposite sense. The rate of advancement or retraction of the cathode 12 under control of the relay 35 is determined by the said time constants of said capacitance-resistance network.

An under-voltage relay 36 is connected between the cathode 12 and the workpiece 10 and is adapted to operate when the voltage thereacross falls below a predetermined value. Operation of the relay 36 is arranged to energize relays 32, 35 into the settings in which they are illustrated and thereby to cause retraction of the cathode 12.

I claim:

1. A method of manufacturing an electrolytically machined workpiece in which the workpiece and a cathode are spaced from each other and are mounted for relative movement towards or away from each other, an electrolyte is passed between said cathode and the workpiece and the workpiece is maintained at a positive potential with respect to the cathode, said method further comprising deriving a first signal which is representative of the conductivity of the electrolyte, deriving a second signal which is independent of the electrolytic current and is representative of the rate of said relative movement between the workpiece and the cathode, combining said first and second signals to produce a control signal and controlling said relative movement between the workpiece and the cathode in accordance with said control signal so as to maintain the cathode and the workpiece at a predetermined spacing substantially independently of changes in the conductivity of the electrolyte.

2. A method as claimed in claim 1 wherein the first and second signals are adjusted to be of substantially equal magnitude and to balance each other when the workpiece and cathode have a predetermined spacing so that said control signal is then substantially zero.

3. A method as claimed in claim 1 in which said first signal is derived from a direct measurement of the conductivity of the electrolyte.

4. A method as claimed in claim 3 in which a conductivity cell is provided and said first signal is proportional to a rectified voltage from said conductivity cell.

5. A method as claimed in claim 1 in which the relative movement between the cathode and the workpiece is effected by a servomotor.

6. A method as claimed in claim 5 in which said second signal is derived from a generator directly coupled to said servomotor.

7. A method as claimed in claim 5 in which said control signal is applied directly to said servomotor and controls the speed thereof.

8. A method as claimed in claim 7 in which the control signal is an interrupted direct current signal, said direct current signal being derived from an algebraic summation of said first and second signals.

9. Apparatus for electrolytically machining a workpiece comprising a cathode spaced from the workpiece; servo means for moving the workpiece and the cathode relatively towards or away from each other; means for passing an electrolyte between the cathode and the workpiece; means for maintaining the workpiece at a positive potential with respect to the cathode; means providing a first signal which is representative of the conductivity of the electrolyte; means providing a second signal which is independent of the electrolytic current and which is representative of the rate of said relative movement between the workpiece and the cathode; and servo control means for combining said first and second signals to produce a control signal for controlling said servo means whereby the cathode and the workpiece are maintained at a predetermined spacing substantially independently of changes in the conductivity of the electrolyte.

10. Apparatus as claimed in claim 9 including means for adjusting the relative magnitudes of said first and second signals so that, when said gap has a predetermined size, said two signals balance each other and said control signal is substantially zero.

11. Apparatus as claimed in claim 9 wherein said means for supplying electrolyte includes a cell through which at least a proportion of said electrolyte passes, and including means providing said cell with a constant input voltage, said first signal being derived from the output of the cell.

12. Apparatus as claimed in claim 9 wherein said servo means comprise a motor and said means for providing the second signal comprise a generator which is coupled to said motor and driven thereby.

13. Apparatus as claimed in claim 12 including amplifier means, said servo control means being connected to said motor through said amplifier means whereby said control signal controls the speed of said motor.

14. Apparatus as claimed in claim 13 wherein rectifier means are provided for rectifying said first and second signals prior to entering said servo control means, and interruptor means are provided, said control means giving a direct current output signal which is passed through said interruptor means to produce a pulsating control signal prior to amplification in said amplifier means.

15. Apparatus as claimed in claim 9 wherein means are provided for indicating and/or controlling the electrolytic current between the workpiece and the cathode.

References Cited

UNITED STATES PATENTS

| | | | |
|---|---|---|---|
| 3,058,895 | 10/1962 | Williams | 204—143 |
| 3,219,564 | 11/1965 | Wilkinson | 204—224 |
| 3,275,538 | 9/1966 | Haupt et al. | 204—143 |
| 3,324,021 | 6/1967 | Haggerty | 204—224 |
| 3,338,807 | 8/1967 | Clifford | 204—143 |

HOWARD S. WILLIAMS, *Primary Examiner.*

S. S. KANTER, *Assistant Examiner.*

U.S. Cl. X.R.

204—224, 228